(12) United States Patent
Murphy et al.

(10) Patent No.: US 9,147,280 B2
(45) Date of Patent: Sep. 29, 2015

(54) PREPARATION AND DISPLAY OF DERIVED SERIES OF MEDICAL IMAGES

(75) Inventors: Sean Murphy, Edinburgh (GB); Andrew Michael Christian Smout, Edinburgh (GB)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 255 days.

(21) Appl. No.: 13/566,196

(22) Filed: Aug. 3, 2012

(65) Prior Publication Data

US 2014/0035916 A1     Feb. 6, 2014

(51) Int. Cl.
    *G06T 15/20*      (2011.01)
    *G06T 15/08*      (2011.01)

(52) U.S. Cl.
    CPC ....................... *G06T 15/08* (2013.01)

(58) Field of Classification Search
    CPC ........................................ G06T 15/08
    USPC ........................................ 345/427
    See application file for complete search history.

(56) References Cited

U.S. PATENT DOCUMENTS

| | | | |
|---|---|---|---|
| 8,073,210 B2 * | 12/2011 | Reinhardt et al. | 382/128 |
| 2006/0025674 A1 * | 2/2006 | Kiraly et al. | 600/410 |
| 2013/0135287 A1 * | 5/2013 | McCabe et al. | 345/419 |

OTHER PUBLICATIONS

Gil et al., Efficient Dilation, Erosion, Opening, and Closing Algorithms, Dec. 2002, IEEE Transactions on Pattern Analysis and Machine Intelligence, vol. 24, No. 12, p. 1606-1617.*

Thurley et al, Fast Morphological Image Processing Open-Source Extensions for GPU processing with CUDA, Manuscript received Feb. 6, 2012; revised May 15, 2012; accepted May 29, 2012, IEEE Journal of Selected Topics in Signal Processing, p. 1-7.*

Marcel van Herk, "A fast algorithm for local minimum and maximum filters on rectangular and octagonal kernels", Pattern Recognition Letters vol. 13, No. 7, Jul. 1992, pp. 517-521.

Joseph Gil, et al. "Computing 2-D min, Median, and Max Filters", IEEE Transactions on Pattern Analysis and Machine Intelligence, vol. 15, No. 5, May 1993, pp. 504-507.

* cited by examiner

*Primary Examiner* — Kee M Tung
*Assistant Examiner* — Yuehan Wang
(74) *Attorney, Agent, or Firm* — Oblon, McClelland, Maier & Neustadt, L.L.P.

(57) ABSTRACT

Certain embodiments of the invention provide a computer apparatus and corresponding computer implement method for slab rendering from a three dimensional (3D) image data set of voxel data. Slab rendering is carried out on a stack of slabs of the same thicknesses in the 3D image data set. The whole stack of slabs is rendered together according to a desired filtering operation by applying a one dimensional van-Herk-Gil-Werman (vHGW) algorithm having a segment size one less than the slab thickness to strings of data that run through the whole stack.

12 Claims, 12 Drawing Sheets

PREPARATION AND DISPLAY OF DERIVED SERIES OF MEDICAL IMAGES

BACKGROUND OF THE INVENTION

Embodiments described herein generally relate to preparation and display of a derived series of medical images from three dimensional (3D) image data sets by slab rendering.

FIG. 1 is a schematic drawing of principal elements of a medical imaging product chain. Initially a patient is scanned using an imaging device to perform computer-assisted tomography (CT), magnetic resonance (MR), digital radiography (DR), computed radiography (CR), positron-emission-tomography (PET), ultrasound or other modality. A modality generates two types of data. The first type of data, labeled original images, are images generated by the modality and are intended to be viewed directly by humans, typically radiologists or other medical professionals. Examples of original images are X-rays, CT cross-sectional images, MR sectional images, ultrasound fan images etc. The second type of data, labeled original data, is data that is not produced in the form of an image, or is composed of a very large collection of images, and is not intended to be viewed by humans directly, or in the aggregate.

The original images and/or original data generated by a modality are transferred to a computer workstation where the original images are locally cached, i.e. held in a memory cache at the workstation. The workstation hosts a digital imaging software application which is used to display the original images to a medical imaging professional on a display system, such as a high resolution monitor or collection of monitors. The digital imaging application may also pass some of the original images directly onwards, for example to other applications on the same computer or computer network, or over a network to other computer systems.

The digital imaging application may process some combination of original images and/or original data to generate derived images. Derived images are images that are different from original images and are intended to be seen directly by a medical imaging professional such as a radiologist.

In image processing of 3D image data sets of voxel data, such as medical image data sets obtained from CT or MR scans, creating a two dimensional (2D) image for display from a 3D image data set is generally performed by some kind of rendering.

A simple form of rendering would be to select an arbitrary plane to view through a 3D image data set, interpolate the voxel data adjacent to the plane to obtain in plane voxel data, obtain a 2D image data set, i.e. pixels from the in plane voxels, and display the 2D image data set as a 2D image.

One step further from this extremely simple example is where a user wishes to move the arbitrary plane through the volume in an axial direction to visualize slices through the volume at various depths. When a user wishes to visualize a succession of slices through a volume at various depths, a standard way of doing this is to create each 2D image from a slab of finite thickness and to advance the slab through the volume incrementally in steps that are equal to, or smaller than, the thickness of the slab. An advantage of using slabs rather than planes is that it can serve to average out noise and smooth undesirably detailed local variation.

To convert a slab, which by definition is a 3D data set, into a 2D image data set, the strings of data through the slab along any particular line orthogonal to the plane of the slab need to be somehow aggregated to produce a single datum using a projection algorithm, this being referred to as compositing. Various different filtering functions are used for this purpose.

One common projection algorithm is based on determining for each image pixel the maximum voxel value seen in the slab along the axial direction. This is known as maximum intensity projection (MIP). Maximum intensity projection is a type of ray casting. In effect, for each pixel in the image, an imaginary ray is cast through the volume data parallel to the view direction. The image data for each pixel is then taken to be the maximum voxel value encountered by the ray as it traverses the slab. Another common projection algorithm is known as minimum intensity projection (MinIP) and uses the minimum voxel value encountered by rays traversing the slab. A third type of projection mode used in slab rendering is Average Intensity Projection (AveIP) in which the voxel data values sampled from the portion of the ray traversing the slab are averaged to produce their collective value. For MIP, MinIP and AveIP the voxel values are scalar quantities. A further projection algorithm is volume rendering (VR) in which the voxel values are vectors for color and opacity, or grayscale and opacity in the case of monochrome rendering.

A stack of slab rendered MIP, MinIP, AveIP or VR slabs may need to be generated with a particular slab thickness in the axial direction and over a particular extent within the volume in a variety of circumstances. For example, a user may wish to produce a derived series for reporting or resampling purposes. Another example is when the visualization application is designed to compute a whole series of slabs in a predictive way. When a user selects a slab for viewing, the application anticipates the possibility that the user's next action will be to scroll from the current slab through the volume along the current view axis, for example to scan through a particular organ in a 3D medical image data set. A stack of slabs is calculated in advance seeded from the slab currently being viewed, e.g. upwards and downwards from the currently viewed slab, even though the user has not yet provided an instruction via the user interface to scroll up or down.

A common form of slab rendering is multi-planar reformatting (MPR). In this technique, MPR data are generated by taking a coordinate in view space, transforming the coordinate into volume space, and resampling the volume data using some form of interpolation to generate a new MPR data value for the discrete view space coordinate. An MPR slice is formed by carrying this out for a plurality of {x, y} coordinates at a fixed z value. If this is repeated for multiple values of z, then multiple MPR slices are determined and these slices can be projected to form an MPR slab. The MPR slab thus comprises a series of MPR slices which are aligned parallel to the image plane and disposed at different positions along the Z-axis.

In slab MPR, the slab can be gradually moved along the view axis in small increments by the user, so that the user sees a succession of images or frames projected from the volume data, where each frame relates to a projection through a slab occupying a location incrementally different from the previous slab. In use, a radiologist will "cine" or "scroll" the slab back and forth interactively. For example, in a CT scan of a human head, a radiologist might take several seconds to traverse the head from top to bottom or back to front, with the traverse involving several hundred frames. A typical technique for generating such image frames is casting a ray through the volume data set for each pixel in an image and sampling the volume data sets at a number of discrete points along each respective ray. If using MIP as the projection algorithm, for example, the maximum voxel value or interpolated value along the ray within the slab is then selected. The selected maximum sample or interpolated value within the slab is taken to be the pixel value associated with its respective ray.

FIGS. 2a and 2b show examples of derived image sequences obtained from different forms of multiplanar reformatting (MPR) which is a kind of slab rendering. FIG. 2a shows parallel MPR. FIG. 2b shows cross-curve MPR.

FIG. 2a shows a parallel MPR example where two positional coordinates and three orientation angles of the sectioning plane are fixed, and the plane is moved along its normal vector in a cine action by varying parameter t, for example with the scroll wheel of a mouse. Typically there are minimum and maximum values for parameter t based on the data set. Different choices of position and orientation give rise to different parallel MPR sequences.

FIG. 2b shows a cross-curve MPR example where a curve is defined through the patient's body, usually corresponding with an anatomical structure such as a vessel. The plane is moved by varying parameter t so that a given point on the plane moves along the curve, and the other degrees of freedom are constrained so that the plane is perpendicular to the curve at the bound point. The boundary values for parameter t are limited to a particular length portion of the vessel, for example. Different curves result in different cross-curve MPR sequences.

Other examples of slab rendered derived image sequences useful in medical imaging include radial MPR sequences formed by rotating the sectioning plane around an axis; and local MPR sequences where a point on the sectioning plane is bound to a curve and the plane is constrained to be tangential to the curve at the bound point. Slab rendering can be computationally costly, and in particular is more costly for thicker slabs. Namely, if the whole volume is made up of 'n×n×n' voxels and the slab thickness is 'm' voxels, then generation of a set of 2D images of the whole volume when the slab increment equals one voxel will have a runtime O that scales with $O(m \times n^3)$.

BRIEF DESCRIPTION OF THE DRAWINGS

Embodiments of the invention are now described by way of example only with reference to the following drawings.

DETAILED DESCRIPTION

Figure 1:
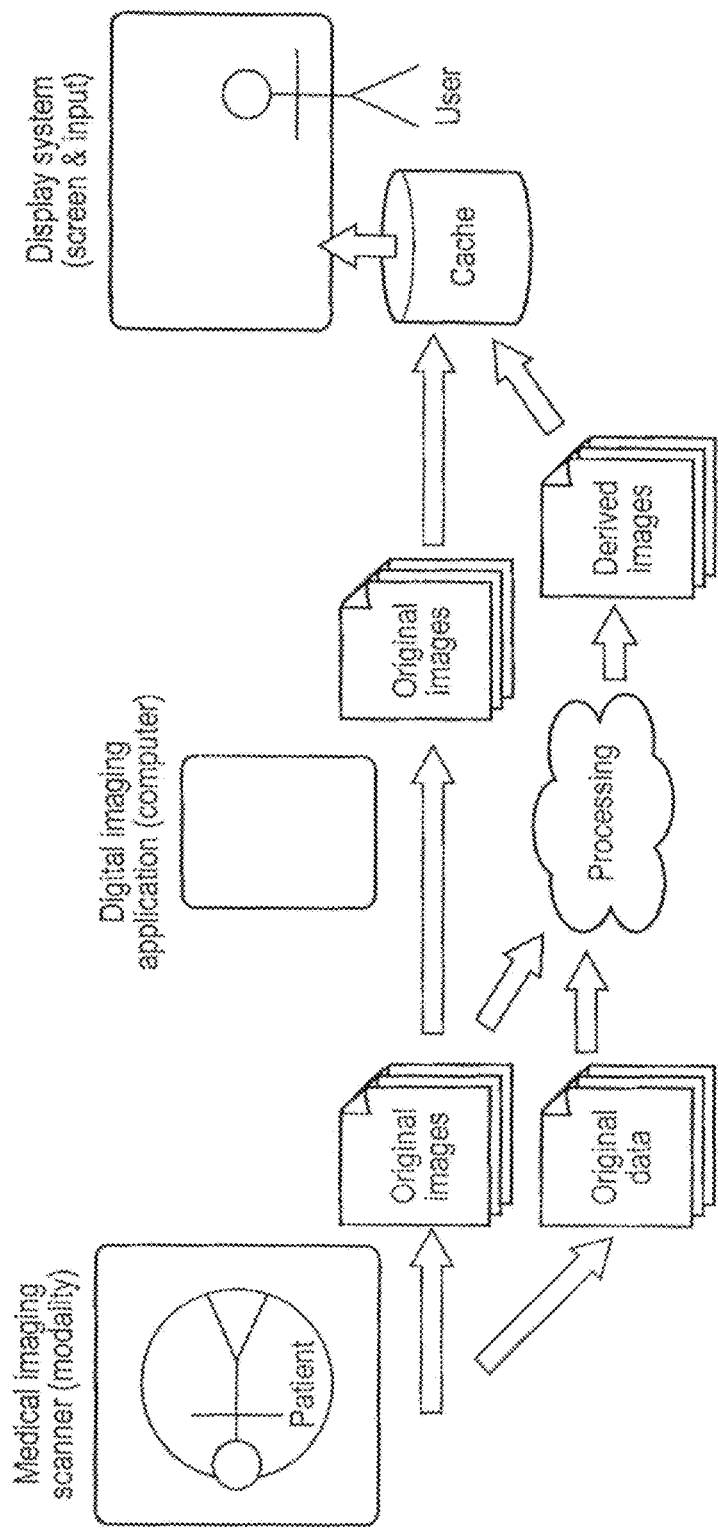
FIG. 1 is a schematic drawing of principal elements of a medical imaging product chain.

The invention is based on the understanding that in many practical cases a user carrying out slab rendering will want to generate a series of 2D images through a part of a volume using a stack of slabs. Consequently, the mathematical problem of compositing the slabs is not a problem in which each slab must be considered in isolation and composited independently of the other slabs, but rather the problem relates to the whole volume occupied by the stack. Moreover, compositing is essentially a one dimensional problem, since each pixel is computed by compositing a string of data through each slab. The problem of filtering a stack of slabs therefore reduces to the one dimensional problem of processing a string of data through the whole stack, i.e. traversing all the slabs.

Following on from this understanding, it was realized that the van-Herk-Gil-Werman (vHGW) algorithm could be applied so long as the slabs were of the same thickness, so that the segment size of the vHGW algorithm is matched to the slab thickness in the slab rendering, in particular with the segment size one less than the slab thickness, and so long as the filtering operation used in the slab rendering complies with the requirement of the vHGW algorithm that the filtering operation is an associative binary operation. Fortunately, all common filtering operations for slab rendering, specifically MIP, MinIP, AveIP and VR, are associative binary operations. Moreover, the vHGW algorithm will inherently compute all segment positions in the string simultaneously, i.e. in the context of slab rendering it will produce a full set of data for a slab that advances through the volume in the smallest possible increments of one thickness unit.

Certain embodiments of the invention provide a computer apparatus comprising: a memory operable to store a three dimensional (3D) image data set of voxel data occupying a volume; and a slab image rendering application operable to: define a stack of slabs of the same thicknesses in the 3D image data set; slab image render according to a desired filtering operation by applying a one dimensional vHGW algorithm having a segment size defined by the slab thickness to strings of data that run through the whole stack, thereby to generate corresponding strings of filtered data, each filtered datum representing a pixel in a 2D image data set composited from one of the slabs; and output a stack of the 2D image data sets from the stack of slabs.

With the vHGW in its usual form, the segment size will be one less than the slab thickness.

The vHGW algorithm is conventionally used to speed up gray-scale morphology operations and has to our knowledge never been used for slab rendering. In other words, the conceptual linkage of slabs in slab rendering to segments in one dimensional vHGW is considered to be new.

In parallel MPR, the slabs will be orthogonal to an intended viewing axis, or more generally a resampling line which may or may not correspond to a desired viewing axis. In cross-curve MPR the viewing axis or resampling line is curved, so the slabs will be aligned to follow this curvature.

Certain embodiments of the invention provide an image acquisition device comprising a computer apparatus as described above.

Certain embodiments of the invention provide a computer automated image processing method for volume data sets comprising: providing a three dimensional (3D) image data set of voxel data occupying a volume; defining a stack of slabs of the same thicknesses in the 3D image data set; and slab image rendering according to a desired filtering operation by applying a one dimensional vHGW algorithm, having a segment size defined by the slab thickness, to strings of data that run through the whole stack in the direction of the viewing axis, thereby to generate corresponding strings of filtered data, each filtered datum representing a pixel in a 2D image data set composited from one of the slabs, thereby to generate a stack of 2D image data sets from the stack of slabs.

The filtering operation may use a vector operator. For example, the filtering operation can be a volume rendering and the vector operator includes an opacity element and either a grayscale element or a set of color elements.

The filtering operation may use a scalar operator. For example, the scalar operator can be one of: maximum intensity projection, minimum intensity projection and average intensity projection.

In some embodiments, the data to which the slab image rendering is applied is obtained by interpolation from the voxel data.

Certain embodiments of the invention provide a computer program product having non-volatile memory bearing machine readable instructions for performing the computer automated image processing method described above.

The vHGW algorithm is a quick way of producing rolling accumulations of a given binary operation over a sequence of elements from a set. The set and the binary operation can be anything as long as they form a semigroup. In mathematics, a semigroup is an algebraic structure consisting of a set together with an associative binary operation.

As a result of computing pixel values in strings for all slabs using the vHGW algorithm, rather than computing each pixel value for each slab independently, the scaling of the computational intensity falls from the conventional $O(m \times n^3)$ to $O(n^3+m)$.

For example, if the proposed approach is used to produce a derived MIP slab series on a volume of 512×512×2096 voxels, where the stack is in the long dimension, i.e. along the 2096 voxel direction, example runtimes in seconds are given in the table below for various slab thicknesses from 8 voxels to 128 voxels, noting that the step size is inherently 1 when applying the vHGW algorithm in the proposed manner.

|  | Slab Thickness (m) | | | | |
| --- | --- | --- | --- | --- | --- |
|  | 8 | 16 | 32 | 64 | 128 |
| Runtime conventional (sec) | 1.0 | 2.0 | 4.0 | 8.0 | 16.0 |
| Runtime vHGW (sec) | 0.8 | 0.8 | 0.8 | 0.8 | 0.8 |

In these examples, with the conventional approach runtime is proportional to slab size, whereas with the proposed approach using the vHGW algorithm runtime is effectively independent of slab size, since the effect of varying the slab thickness is negligible, i.e. $O(n^3+m) \approx O(n^3)$ when n>>m.

A stack of rendered images can therefore be produced quickly and in a time which is largely independent of slab thickness.

Figure 3:
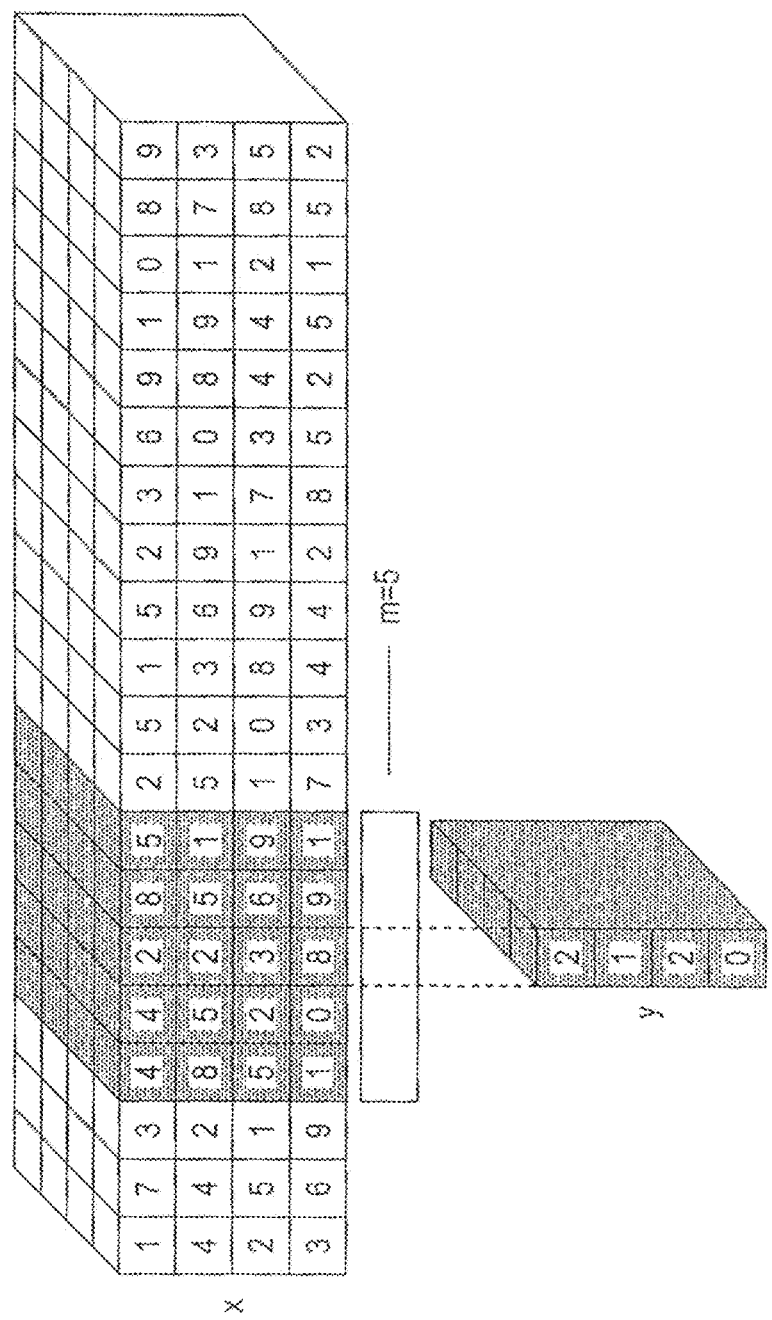
FIG. 3 shows a simplified example of a set of volume data with scalar voxel values together with a MinIP result for one slab.

FIG. 3 shows a simplified example of a set of volume data with scalar voxel values. The 3D data set has 4×4×20 voxels, with the axial direction being along the long dimension of the volume. One example slab is shown shaded and has a thickness of 5 voxels. For simplicity it is assumed that the data used for the rendering is the voxel data, whereas it is understood this will not generally be the case, since typically the data that are rendered will be interpolated from the voxel data. In other words, in this simplified representation we assume the view space coordinate system, i.e. the coordinate system used for the visualization, is the same as the volume space coordinate system, i.e. the coordinate system of the original voxel data.

Example scalar values are shown for voxels on one side of the volume. If MinIP is applied to the shaded slab, the resultant pixel values ascribed to the slab for the four pixels corresponding to the four rows of five voxels in the slab are 2, 1, 2, 0 as illustrated by the composited "slice" illustrated. Each pixel value for each slab is thus calculated in a rowwise manner using a string of 'm' numbers in the relevant row, where 'm' is the thickness of the slab in terms of its number of voxels, which in a real example would be the number of interpolated data points in the view space coordinate system.

Figure 4:
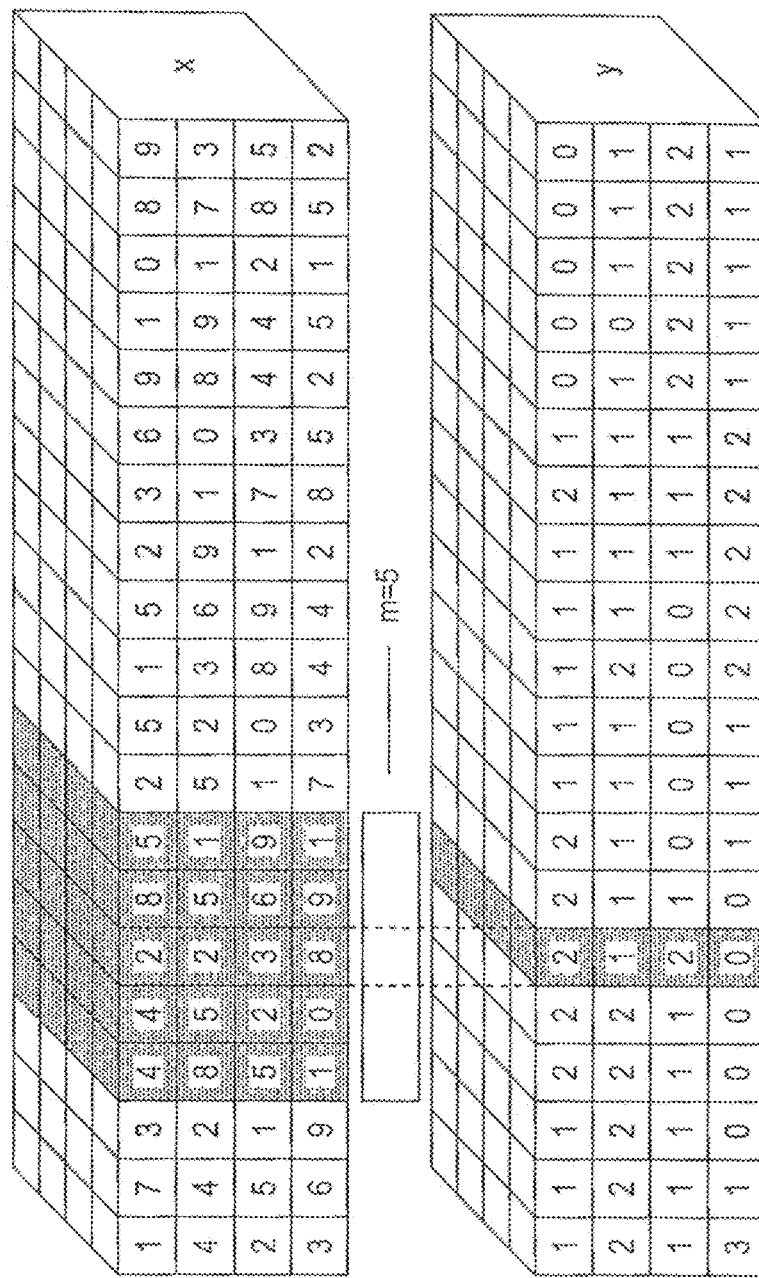
FIG. 4 shows the same set of volume data as FIG. 3, but now with all the 'result' MinIP values shown.

FIG. 4 shows the same set of volume data as FIG. 3, but now with all the 'result' MinIP values shown below the unfiltered data values. In FIG. 4, the top row of example values 1, 7, 3, 4, 4, 2 . . . 0, 8, 9 is also marked together with the corresponding result row 1, 1, 1, 2, 2, 2 . . . 0, 0, 0.

Figure 5:
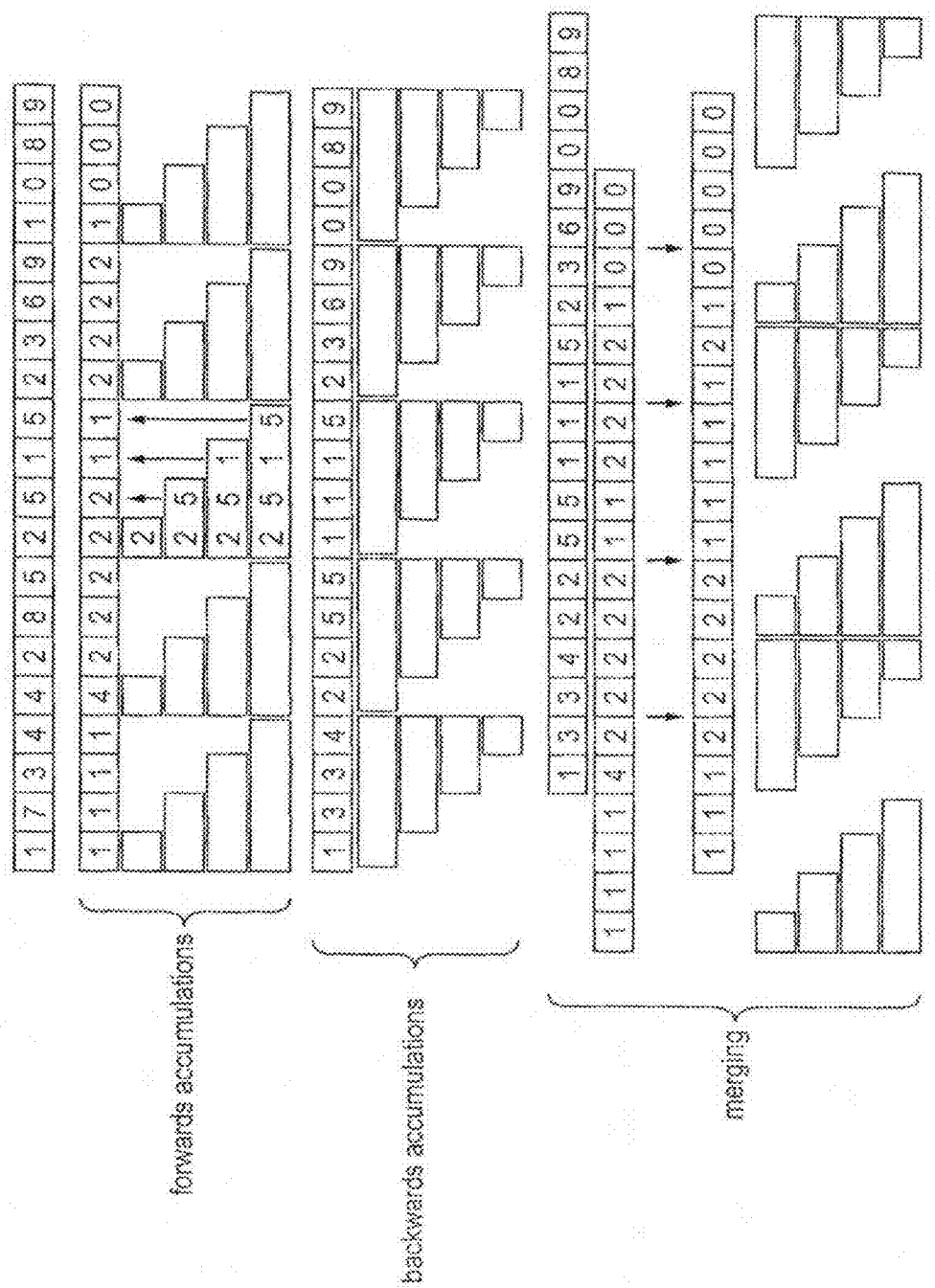
FIG. 5 shows a simplified example of how the data values shown in the top row of FIGS. 3 and 4 can be processed using a van-Herk-Gil-Werman (vHGW) algorithm.

FIG. 5 shows a simplified example of how this string of data values can be processed using the vHGW algorithm.

As described in the introduction of US 2002/0150305A1 there are three steps to the vHGW algorithm, each of which is shown as labeled in FIG. 5:

1. Partitioning the data into overlapping segments or kernels of a fixed size
2. Creating forward and backward accumulations per datum per segment
3. Merging the forward and backward accumulation values according to the chosen binary operator (e.g. minimum in this example).

The original papers on the vHGW algorithm are:

van Herk, M. (1992). A fast algorithm for local minimum and maximum filters on rectangular and octagonal kernels. *Pattern Recognition Letters,* 13(7), 517-521. doi: 10.1016/0167-8655(92)90069-C.

Gil, J., & Werman, M. (1993). Computing 2-D min, median, and max filters. *IEEE Transactions on Pattern Analysis and Machine Intelligence,* 15(5), 504-507. doi: 10.1109/34.211471.

It is noted that sometimes the order of the authors in the two papers is reversed when referring to the algorithm, i.e. the algorithm is sometimes referred to with the acronym GWvH.

In our case applying vHGW to slab rendering, the slab thickness is the segment or kernel size.

As is evident from the required result data string near the bottom of FIG. 5 is the same as the result data string in FIG. 4. In other words, the vHGW algorithm generates the same results data as the conventional algorithm based on independently computing the minimum value for each possible position of the slab in the stack. In particular, it is noted that the vHGW algorithm inherently computes values of 'min' for all possible slab positions, so the results are suitable for showing how a slab incrementally advances through the volume by one datum at a time in the axial direction.

Having shown the method as applied to a particular row of data graphically, we now change to a more mathematical representation where 'x' represents a row through the whole stack of slabs and 'y' represents a row from the resultant stack after compositing according to the binary operation, in this case 'min'.

$$x_i \in \mathbb{R} \text{ for all } i \in \{1, 2, \ldots, n\}$$

$$y_i = \min_{j=i}^{j=i+m-1} x_j$$

$$y = vHGW(\min, m, x)$$

Here the vHGW algorithm is represented by a function of the same name which when applied to the row of data 'x' for a slab of thickness 'm' using the binary operator 'min' produces the row of results data 'y'.

In general, the binary operation can be replaced with any associative operator. In other words, the same approach can be applied to any form of slab rendering, provided that the rendering is based on an operator that is binary and associative.

A MIP slab rendering process based on a 'max' operator can then be described as follows:

$$x_i \in \mathbb{R} \text{ for all } i \in \{1, 2, \ldots, n\}$$

$$y_i = \max_{j=i}^{j=i+m-1} x_j$$

$$y = vHGW(\max, m, x)$$

An AveIP slab rendering process based on computing the mean can then be described as follows:

$$x_i \in \mathbb{R} \text{ for all } i \in \{1, 2, \ldots, n\}$$

$$y_i = \frac{1}{m} \sum_{j=i}^{j=i+m-1} x_j$$

$$y = \frac{1}{m} vHGW(+, m, x)$$

where the plus symbol '+' is used to denote the mean operator.

Min, Max and Mean are all examples of operators that apply to scalar data values. However, in VR, each voxel is associated with a vector value of opacity 'a' and either a grayscale value (for monochrome images) or a set of color values, e.g. rgb (red green blue) or cmyk (cyan magenta yellow key).

The same formalism can be applied to these vector values.

VR slab rendering involves operating on the assigned color (or grayscale) and opacity of each voxel, which is generally a 4 vector (rgba). This operation can be described via the over operator as follows:

$$\begin{pmatrix} C_a \\ \alpha_a \end{pmatrix} \odot \begin{pmatrix} C_b \\ \alpha_b \end{pmatrix} = \begin{pmatrix} \frac{\alpha_a C_a + (1-\alpha_a)\alpha_b C_b}{1-(1-\alpha_a)(1-\alpha_b)} \\ 1-(1-\alpha_a)(1-\alpha_b) \end{pmatrix}$$

If a row of voxels need to be composited the over operator is applied between each of them starting at one end of the string or row of voxels and finishing at the other $$\begin{pmatrix} C_n \\ \alpha_n \end{pmatrix} \odot \begin{pmatrix} C_{n-1} \\ \alpha_{n-1} \end{pmatrix} \odot \ldots \odot \begin{pmatrix} C_2 \\ \alpha_2 \end{pmatrix} \odot \begin{pmatrix} C_1 \\ \alpha_1 \end{pmatrix}$$

Variations from this exact scheme are possible. For instance the $C_a$ and $C_b$ can be "premultiplied" by the opacities to give $c_a = C_a * \alpha_a$ and $c_b = C_b * \alpha_b$. In which case the end product of the slab would look the same but the operator would be as follows:

$$\begin{pmatrix} c_a \\ \alpha_a \end{pmatrix} \odot \begin{pmatrix} c_b \\ \alpha_b \end{pmatrix} = \begin{pmatrix} c_a + (1-\alpha_a)c_b \\ 1-(1-\alpha_b)(1-\alpha_b) \end{pmatrix}$$

The order of application does not need to be specified, since the over operator is associative. Since the over operator is associative and otherwise conforms to the requirements of the vHGW algorithm, it can be used for VR slab rendering, which can be expressed as follows:

$$x_i \in \mathbb{R}^4 \text{ for all } i \in \{1, 2, \ldots, n\}$$

$$y_i = x_{m+i-1} \odot x_{m+i-2} \odot \ldots \odot x_{i+1} \odot x_i$$

$$y = vHGW(\odot, m, x)$$

where the circular symbol with a dot in the center $\odot$ is used to denote the 'over' operator.

Figure 6:
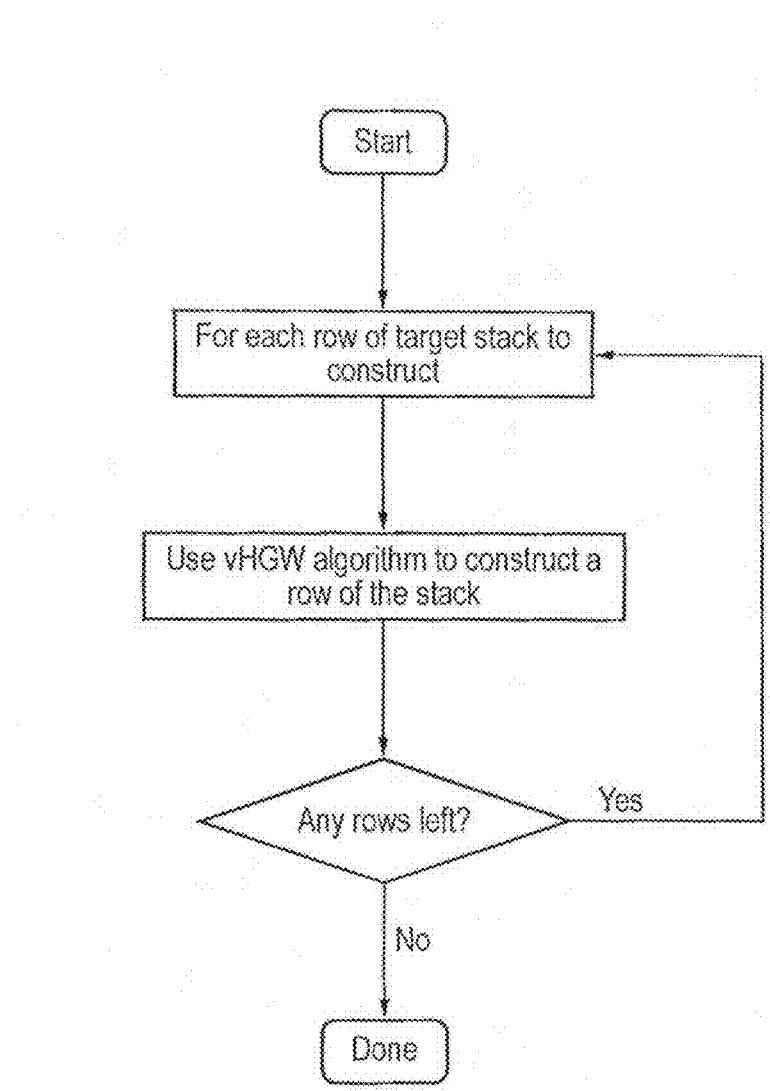
FIG. 6 is a flow diagram of the vHGW process applied to slab rendering.

FIG. 6 is a flow diagram of the process. After starting the process, each row of the target (i.e. results) stack is computed using the vHGW algorithm. The flow diagram when interpreted literally envisages that each row is computed one after the other in series. However, it will be understood that the computation of each row is independent, so may be carried out in parallel or serially, or in any combination of parallel and serial depending on the computing resources available and how they are used by the software application. Once the results have been computed for all rows the full set of 2D images of the stack has been computed and is ready for output, display and storage as desired.

For completeness, it is now described in more detail how the original series data is manipulated, including the step of transforming between the volume space and view space.

Volume data comprises a plurality of voxels arranged in a 3D grid. Each voxel has a voxel value associated with it. The voxel values represent measurements of a physical parameter. For example, in the case of CT scans, the voxel values represent the opacity of those voxels to X-rays, i.e. their X-ray stopping power. X-ray stopping power is measured in Hounsfield units (HUs) which is closely correlated with density (mass per unit volume).

The voxels of volume data acquired by medical imaging devices are in most cases acquired on a Cartesian grid, i.e. the data points are aligned in three orthogonal axes I, J and K. In some special cases, the K axis may not be orthogonal to the I and J axes to take account of gantry tilt or slew. Moreover, the axes are conventionally ascribed a common origin at one corner of the volume. However, it will be appreciated that this choice of origin is arbitrary. These axes define a volume space. A volume-space coordinate system is used to identify the location of each voxel in the volume space. The volume-space coordinate system has unit (or basis) vectors i, j and k which are aligned with respective ones of the orthogonal axes I, J and K.

The 2D image-data comprise a plurality of image pixels arranged in a 2D grid. Although the image itself is 2D, it is helpful to define a 3D view space containing the image. View space is defined by three orthogonal axes X, Y, Z having a common origin at one corner of the image. Again, the choice of origin is arbitrary. The X- and Y-axes are in the plane of the image (the image plane) and are aligned with the 2D grid of image pixels. The Z-axis is aligned parallel with the view axis (i.e. perpendicular to the image plane). A view-space coordinate system is defined to identify the location of each voxel and each image pixel in view space. The view-space coordinate system has unit, or basis, vectors x and y in the image plane and z along the view direction. The unit vectors x and y are defined such that the image pixels are of unit length along each of the axes in view space.

Images may be generated from the volume data using a slab rendering method such as MPR. MPR data are generated by taking a coordinate in view space, transforming the coordinate into volume space, and resampling the volume data using some form of interpolation to generate a new MPR data value for the discrete view space coordinate. An MPR slice is formed by carrying this out for a plurality of {x, y} coordinates at a fixed z value. If this is repeated for multiple values of z, then multiple MPR slices are determined and these slices can be projected to form an MPR slab. The MPR slab thus comprises a series of MPR slices which are aligned parallel to the image plane and disposed at different positions along the Z-axis.

A 2D image for display is formed by projecting (collapsing) the MPR slab along the view direction onto the image plane. This is done according to a projection algorithm. The projection algorithm used in any particular case will depend on the desired appearance of the final image.

It will be appreciated that in some cases, only voxels having a voxel value in a selected range, or "window" will be of interest. For example, to reveal soft tissue on a CT scan, only voxel values in the range −200 to 500 HU may be of interest. To achieve such a view, a MIP or MinIP rendered image is typically calculated as described above, and subsequently the image is post-processed to enhance the contrast of voxel values in the desired range and suppress contrast outside that range.

Generally, the view axis will not coincide with one of the volume space axes, i.e. the image plane will have an arbitrary tilt angle with respect to any two of the volume space axes. Consequently sample points along a ray which is cast parallel to the view axis will not coincide with voxel coordinates, but rather each sample point along the ray will lie at arbitrary distances from a plurality of nearby voxel coordinates. Moreover, even if the view direction was along a volume space axis, in the general case each ray would not form a line which cut through a voxel coordinate in each slice of the volume data.

Because of this, when a view axis and a slab orthogonal to the view axis are defined, rays are generated which cut through the slab parallel to the view direction and spaced apart in the plane of the slab in a regular square grid. The rendering application then samples points along the portion of each ray that lies inside the slab, and for each sample point calculates a voxel value based on voxel values of the volume data that lie nearby. For example, for a ray passing almost equidistantly between adjacent voxel coordinates or centers, the average of the eight nearest voxel values, corresponding to the corners of a cube, might be used to arrive at the voxel value for the sample point. In general, a voxel value used for a particular ray passing through the MPR slice will be interpolated from the surrounding voxel values using a weighting based on the distance between the ray and the voxel centers. For example, a tri-linear interpolation between the eight surrounding voxels in the MPR slice is often used. Common interpolation methods include nearest neighbor (1 voxel), tri-linear interpolation (8 voxels), and tri-cubic interpolation (64 voxels).

A typical technique for generating such image frames is casting a ray through the volume data set for each pixel in an image and sampling the volume data sets at a number of discrete points along each respective ray. If using MIP, the maximum voxel value or interpolated value along the ray within the slab is then selected. The selected maximum sample or interpolated value within the slab is taken to be the pixel value associated with its respective ray.

Figure 7:
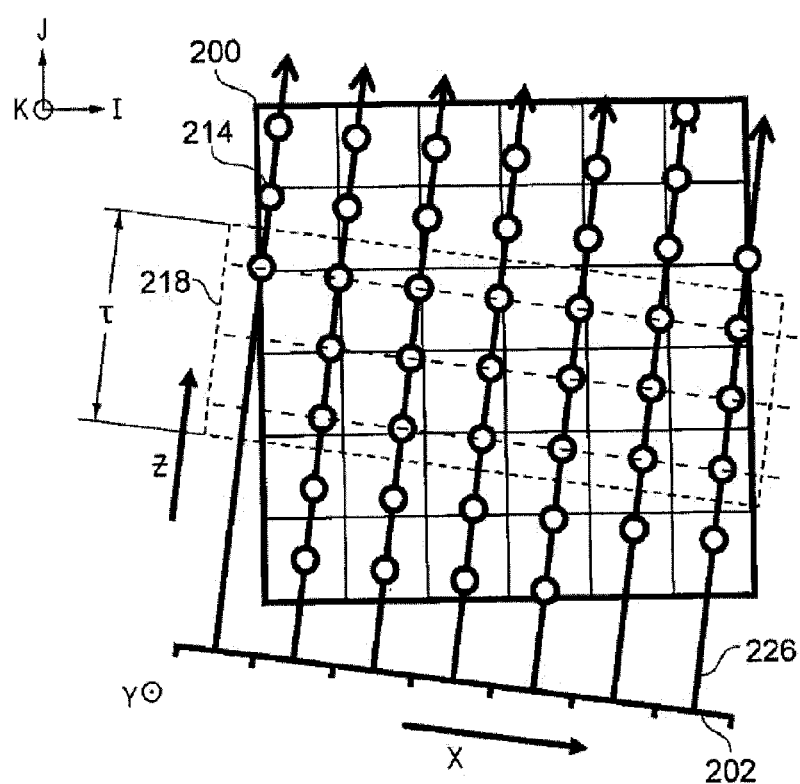
FIG. 7 illustrates schematically a typical relationship between volume and view space and how interpolation and sampling is carried out.

FIG. 7 illustrates schematically a typical relationship between volume and image space and how the interpolation and sampling is carried out. The volume data set 200 represents a volume space having a grid shown aligned to the sides of the paper. The volume-space is illustrated in two-dimensions and comprises I and J axes, but also includes a third dimension along an axis K, which is perpendicular to the plane of the paper and therefore not visible. The voxel values for the volume data set are taken to be in the center of each of the smaller squares and have a common origin at one corner of the volume data, e.g. in the lower left square of the volume space. Only 6×6 voxels are illustrated, but it will be appreciated that many more values are typically used, but fewer have been used for illustrative purposes.

An image plane 202 is illustrated in FIG. 7 lying at an angle to the volume data set, i.e. tilted. In other words the image plane is not parallel to the volume data set. As described above, a number of rays 226 are cast from the image plane 202 into the volume data set 200 in a selected view direction parallel to a view axis Z. Each of the rays corresponds to a pixel at the image plane for forming an image. The image plane illustrated is 1-dimensional, for example along an axis X, but in practice the same process will be repeated in a second direction Y out of the plane of the paper. It is noted that in FIG. 7, that the K and Y axes are parallel. In reality, the K and Y axes have an arbitrary relationship and will not be aligned. However, to illustrate the principles clearly in a two-dimensional representation, the K and Y axes have been aligned.

A slab 218 of thickness T is located in the volume-space 200 which is parallel to the image plane 202 and extends along the view axis Z. The slab is a 3D volume that also extends into the plane of the paper. The slab is represented by a dashed rectangle. A number of discrete sample points 214 are selected that lie on each of the rays, which are illustrated as circles with a regular spacing. Before the sample points are collapsed or projected onto the image plane to form a 2D image, the values at each of the sample points is determined. Each sample point will lie in an arbitrary position in relation to the experimentally obtained voxel locations and an interpolation method will need to be applied to determine a suitable voxel value for the sample point from the voxel values of nearby experimentally obtained voxels. An interpolation method, such as tri-linear interpolation, can be used to obtain the value at the sample point. Once the values are obtained for each of the sample points, the sample point can be projected onto the image plane using MIP, for example, to obtain the values for each of the pixels.

Figure 8:
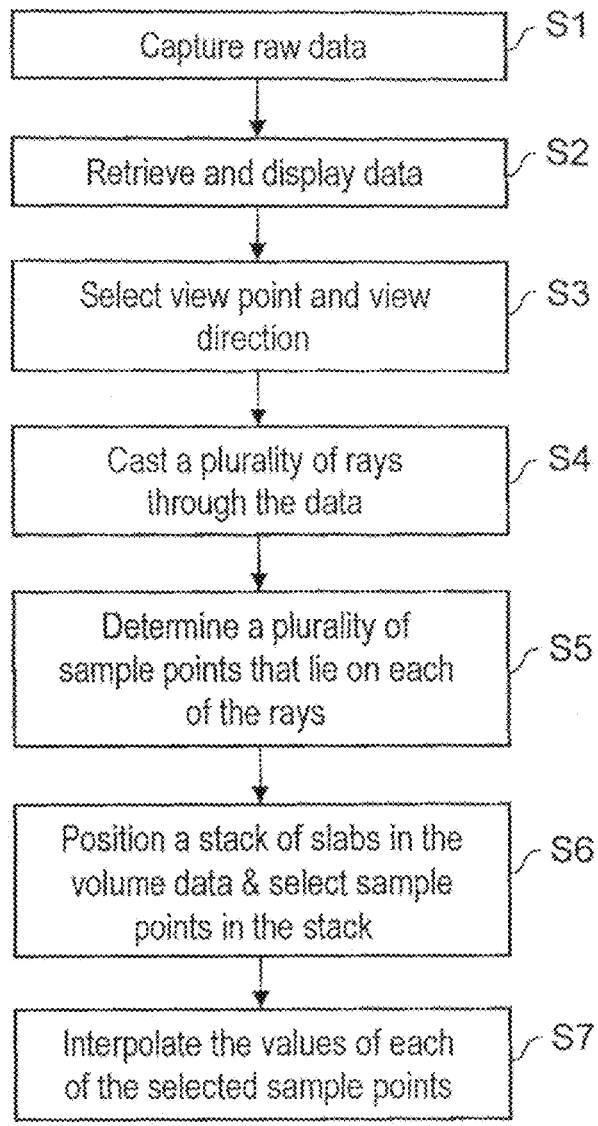
FIG. 8 is an overview of the processing stages to generate an interpolated data set in view space for the slab stack.

FIG. 8 is an overview of the processing stages to generate an interpolated data set in view space occupying the sub-volume within the overall 3D image data set filled by the stack of slabs.

In step S1, raw volume data are captured by suitable capture apparatus, and preprocessed and stored. For example, the raw volume data could be captured by a CT scanner or MR scanner. The data are pre-processed to generate volume data in the form of a 3D array of voxel values. This may include, for example, normalization from capture apparatus units to conventional units and mapping of data not captured on a regular voxel grid to a regular grid should the program require that images are equally spaced in the image stack. The data may be stored in a random access memory of the capture apparatus for immediate further processing. However, in general the data are stored in a storage device (e.g., a file archive) for later retrieval and processing. This allows other apparatus, for example remote computer workstations connected to the storage device, to perform the processing at a later time.

The volume data are arranged in rows running parallel to three axes I, J, K which will generally be orthogonal, but in some special cases may not be. For example, the K axis will not be orthogonal to the I and J axes if gantry tilt or slew exists. Neighboring voxels are generally separated along each of the directions corresponding to these axes by unit vectors. That is to say, the distance between voxel centers along each of the axes is unity. However, other examples may arise. In particular, it is relatively common for voxel centers to be spaced differently along the K axis and sometimes not equally spaced.

In step S2, the volume data are retrieved and displayed with an initial configuration based on a default set of visualization parameters on a monitor, for example. This allows practitioner to view the volume data and select a view point and view direction. It will be appreciated that the volume data may be retrieved an arbitrary time after the data are captured and stored.

In step S3, a desired view point and view direction is defined. This is typically based on a user selection by a practitioner based on the displayed volume data set. The view direction may also be referred to as a view axis. A view-space coordinate system X, Y, Z is defined in which neighboring pixels in an image for display are separated along the X- and Y-axes by corresponding unit vectors and the Z-axis is aligned with the view direction, i.e. is the view axis or axial direction referred to further above.

The user is able to view the volume data and select the desired view point and view direction using the keyboard 38 and mouse 40 in combination with a graphical user interface (GUI) displayed on the display 34, for example, using a movable screen icon in combination with the mouse, track pad etc. to point and click, a touch screen or other known techniques.

In step S4, a plurality of rays is cast from the image plane into the volume data in the view direction parallel to the Z axis. In this example, a ray is cast for each pixel of an image at the image plane.

In step S5, a plurality of sample points is determined along each of the rays within the volume data set, which are illustrated as circles and spaced at regular intervals along the rays at the same Z location for each ray, resulting in the regular pattern of sample points shown in FIG. 7. The sample points along each ray at the same Z-position are referred to as being in a single MPR plane.

In step S6, a sub-volume is defined for the stack of slabs in the volume data set and sample points that lie within the stack are selected for further processing.

In step S7, the value of each of the selected sample points that lie on each ray and within the stack of slabs is obtained. The value of each of the sample points is obtained by interpolating the surrounding voxel values using a weighting based on the distance between the ray and the voxel centers. In this example, a tri-linear interpolation between the eight surrounding voxels in the MPR slice is used. However, other interpolation methods such as nearest neighbor (1 voxel) or tri-cubic interpolation (64 voxels) could be used.

These data output from step S7 make up the data set which is processed using the vHGW algorithm as described with reference to FIGS. 3 to 6 above.

Figure 9:
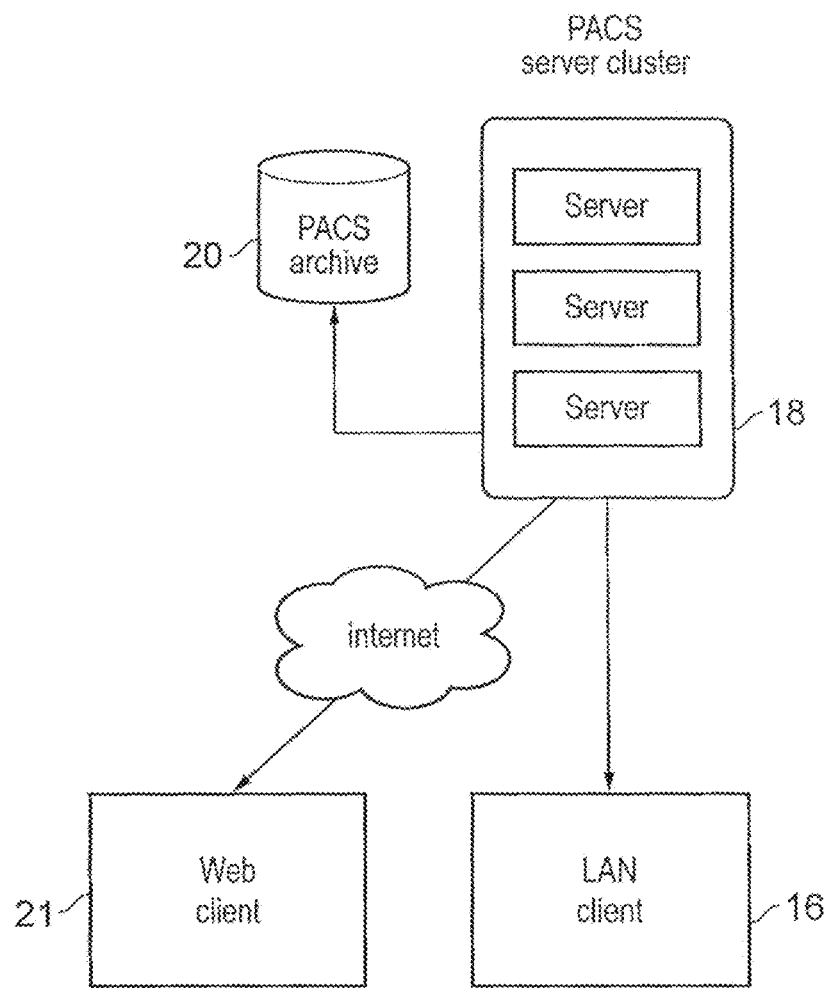
FIG. 9 is a simplified schematic diagram showing a client-server architecture following a standard PACS system.

FIG. 9 is a simplified schematic diagram showing a client-server architecture following a standard Picture Archiving and Communication System (PACS) system which is suitable for hosting a visualization application as described above. The PACS is used as a store for volume data representing diagnostic images of different types in a digital format organized in a single central archive. A PACS archive 20 is connected to a PACS server cluster 18. Web and LAN client computers 21 and 16 are connected to the PACS server cluster 18 via the internet and a hospital network connection respectively. In the following description, we assume a visualization application for generating images is on the server, but the location of the visualization application may be different in other embodiments.

For a derived image series, a tool is identified that changes the slab position in the stack. This is called the scroll tool and typically for medical imaging applications it is bound to the action of dragging the mouse with either the left or the right button down. Additionally the scroll tool may be bound to the scroll operation of a wheel mouse or touch pad that supports scrolling. The operation of the scroll tool depends on the series type. Scrolling will benefit from the fact that the whole stack has been computed in one go using the vHGW algorithm and will be available without any further computationally induced latency so that the users perceives a high update rate.

Figure 10:
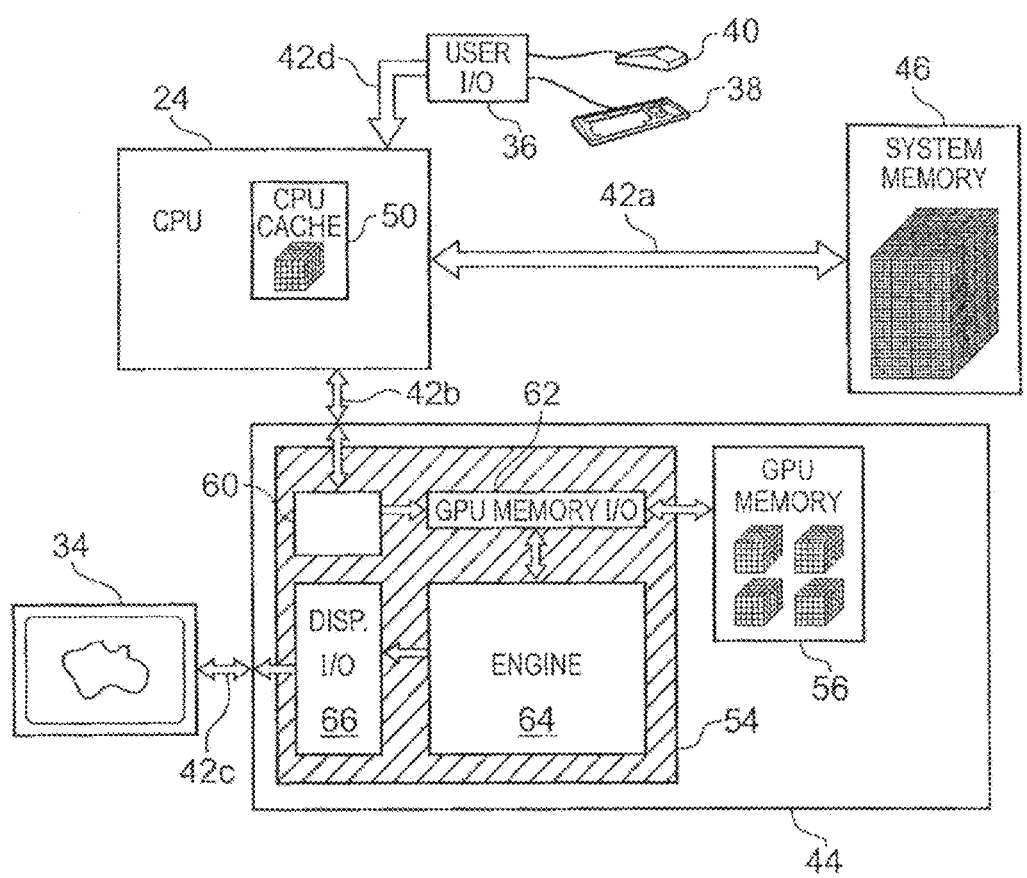
FIG. 10 schematically shows a computer for processing 3D image data.

FIG. 10 schematically shows some of the features of a computer suitable for running the visualization application. A system memory 46 may comprise RAM or a disk drive or a combination of both. Volume data is stored in the system memory. Any suitable form of mass storage device may be used. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing 3D image data sets and carrying out 3D rendering of such data sets. The processing unit thus comprises CPU and GPU elements.

The user is able to select desired visualization parameters using the keyboard 38 and mouse 40 in combination with a graphical user interface (GUI) displayed on the display 34, for example using a movable screen icon in combination with a mouse, track pad etc. to point and click, a touch screen or other known techniques. With reference to FIG. 9, the computer of FIG. 10 may be the server 18 or the workstation at the LAN client 16 or web client 21.

Figure 2A:
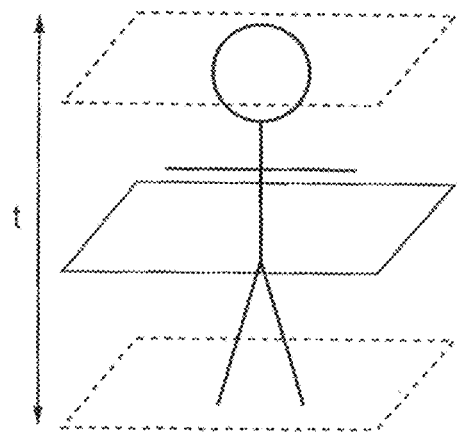
FIGS. 2a and 2b show two examples of derived image sequences obtained by slab rendering original image sequences.
Figure 2B:
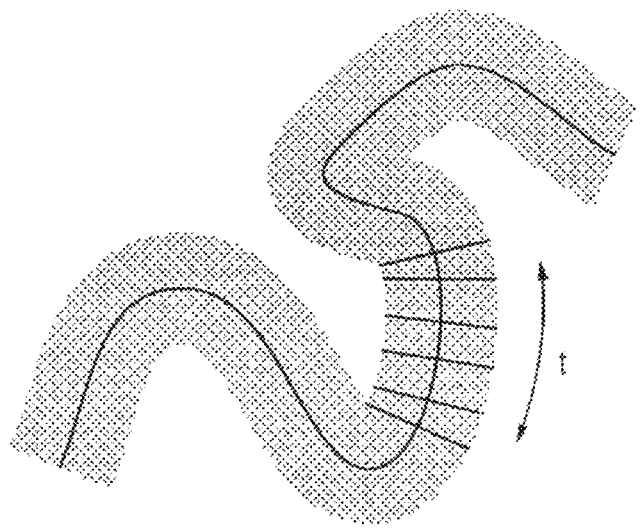
Figure 11:
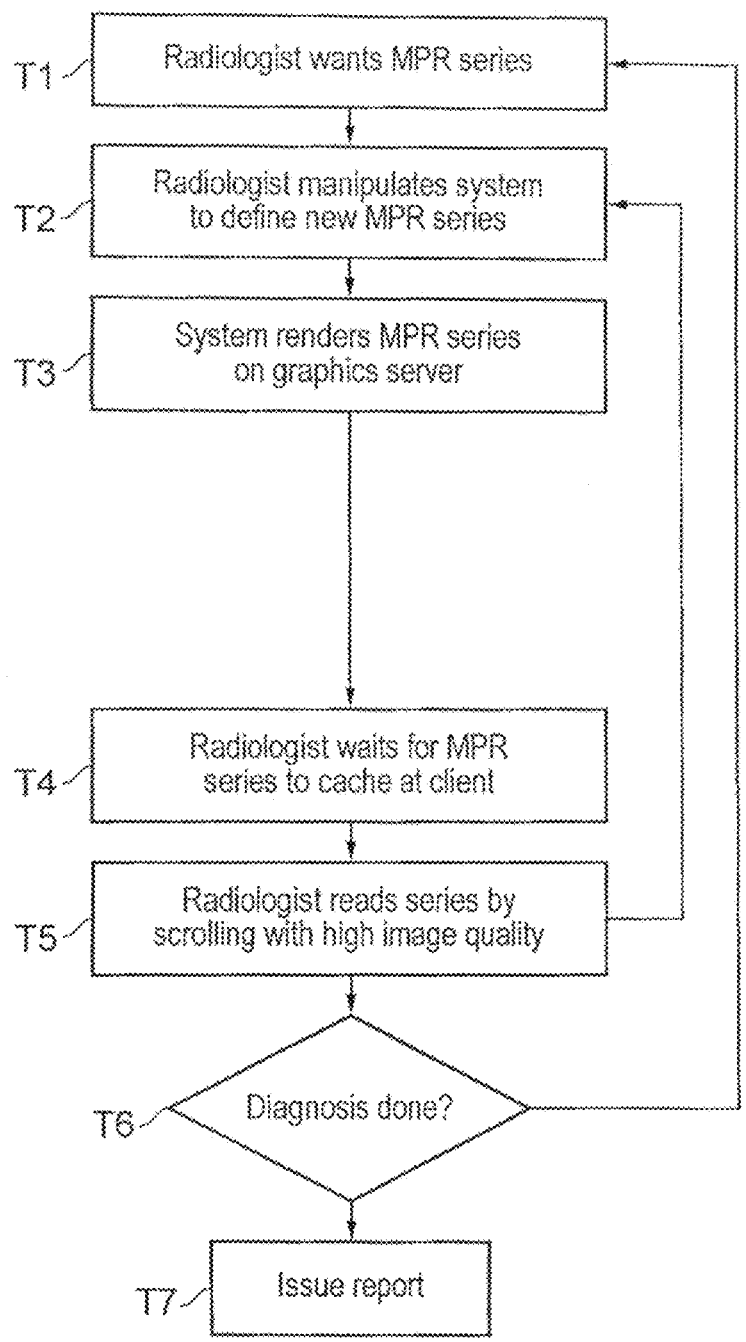
FIG. 11 shows an example workflow.

FIG. 11 shows an example workflow for preparing a sequence of derived images for slab MPR, such as would be applicable to the MPR examples of FIGS. 2a and 2b. This example workflow is a specific example of the general derived image workflow shown in FIG. 1.

In Step T1, the sequence initiates with a radiologist wanting to have a slab MPR series prepared for his or her analysis.

In Step T2, the radiologist uses the client application to manipulate the viewed image in a way which either explicitly results in the radiologist defining a desired MPR series, or allows the client application to infer an MPR series, i.e. a derived image series of a particular image type, which the radiologist would like to view in order to conduct a diagnostic analysis. The radiologists interaction with the user interface explicitly or implicitly defines a specification for the visualization, namely the viewing parameters.

In Step T3, the specification of the desired MPR series is received by the derived image generation subsystem which could be the server in a client-server set up or part of a workstation. The MPR series is generated and sent to the client or the appropriate part of the application running on the workstation.

In Step T4, the radiologist waits for the MPR series to load. In a workstation set up, this delay will be negligible. In a client-server set up, this wait is associated with caching at the client as the generated MPR series is transferred over the LAN or internet.

In Step T5, the radiologist reads or views the series by scrolling interactively up and down by varying the slab location in the view direction. Further user interaction with the user interface may cause the process flow to jump back to Step T2 if the user interaction is interpreted to be a request to redefine the slab stack. Once the radiologist has concluded the study of the MPR series loaded in Step T1, the process flow moves to Step T6.

In Step T6, the radiologist is given the option of reviewing a further MPR series in which case the workflow is repeated.

In Step T7, the workflow ends with a report being issued.

An example case of where the stack definition is changed at Step T5/T2 is when a user through the user interface adjusts the inclination of the sectioning plane, e.g. in planar MPR, to indicate that he or she wishes to see a slightly different series at the new plane angle. In this case, the visualization application transparently repeats steps T2 to T4 such that the adjusted series automatically appears on the display.

As well as the client-server configuration, the proposed method is equally applicable to a workstation configuration.

One possible mode of use involves, the radiologist configuring the viewing parameters of a study, whereupon a first batch of slab images is computed for the locus near an initial viewing plane. When the radiologist scrolls through these images, and/or in expectation of the possibility of receiving such a scroll command from the radiologist, additional batches of slab images are computed for loci adjacent to the first batch in preparation for the user requesting them.

It is noted that the stack of slabs may represent the whole set of slabs which the user wishes to view, or may be only a part of the set of slabs. In other words, the method may be applied in such a way that the desired set of slabs is subdivided into several batches, and each batch processed according to the vHGW method described herein.

While certain embodiments have been described, these embodiments have been presented by way of example only, and are not intended to limit the scope of the inventions. Indeed, the novel methods, computers, computer program products and image acquisition devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Figure 12:
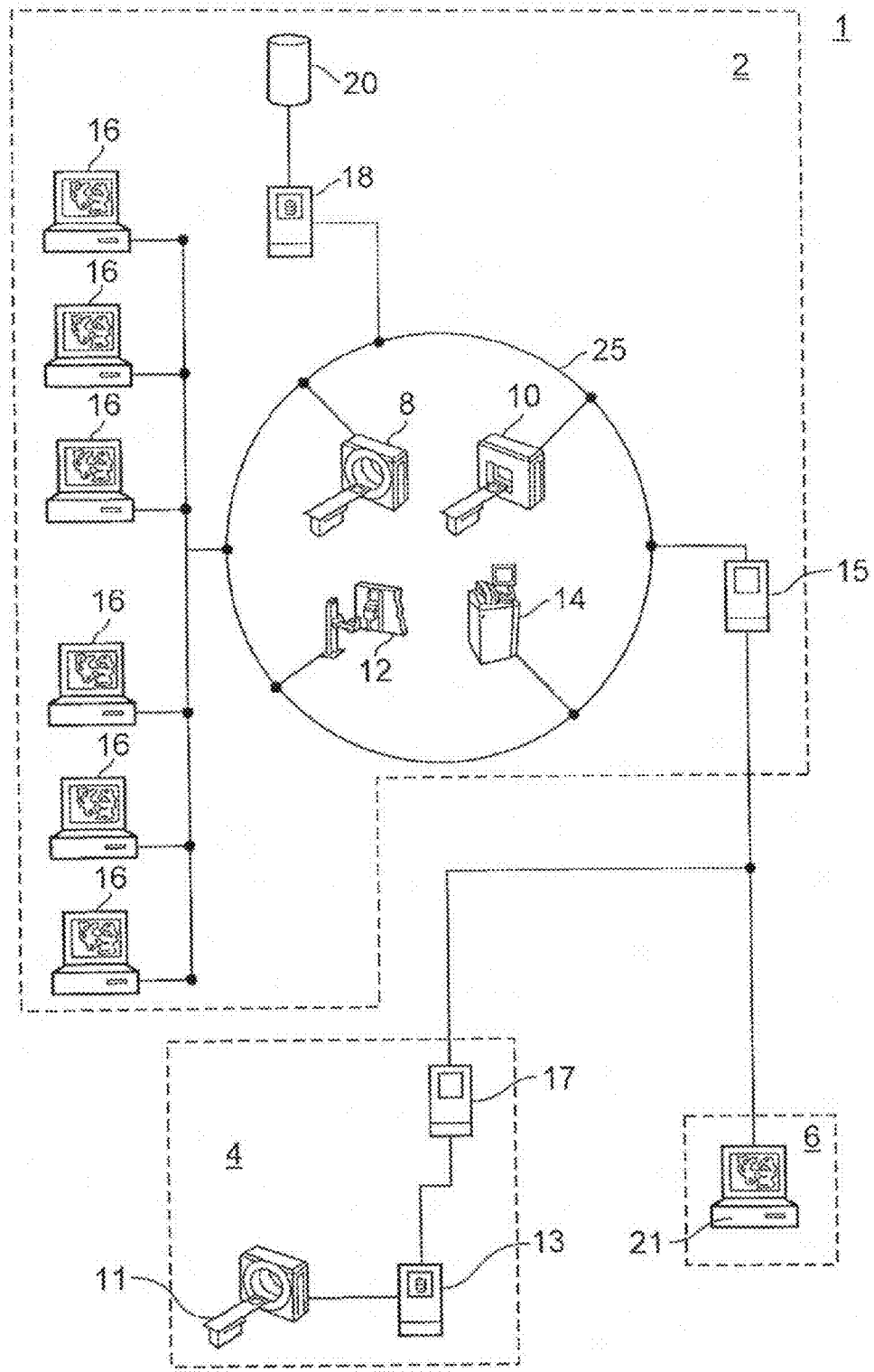
FIG. 12 is a schematic representation of a hospital network.

FIG. 12 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of image acquisition devices for acquiring patient images, in this example, a CT scanner 8, a MR imager 10, a DR device 12 and a CR device 14, a plurality of computer workstations 16, a common format file server 18, a file archive 20 and an internet gateway 15. All of these features are inter-connected by a local area network (LAN) 25.

The remote diagnostic device component 4 comprises a CT scanner 11, a common format file server 13 and an Internet gateway 17. The CT scanner 11 and file server 13 are commonly connected to the Internet gateway 17, which in turn is connected via the Internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request retrieval of the image. In response, the file server 18 will retrieve it from the archive 20 and pass it to the user via the LAN 25. Similarly, a user working remotely from the main hospital component 2 may also access and transmit data stored on the archive 20, or elsewhere on the network 1. Access may be either within the remote diagnostic device component 4, or within the remote single user component 6.

The software operating on or from the computer workstations 16, 21 is configured to conform to the common image data format such as DICOM. The standardization of the image data format ensures that different software applications on the computers 16, 21, the file servers 13, 18 and file archive 20 and the output from the different computer controlled diagnostic devices 8, 10, 11, 12, 14 can share image data. A user such as a radiologist, a consultant, or a researcher can access any volume data set from the file archive 20 using the computer workstations 16, 21 and generate and display slab rendered or other images.

The invention claimed is:

1. A computer apparatus comprising:
   a memory operable to store a three dimensional (3D) image data set of voxel data occupying a volume; and
   a slab image rendering application operable to:
      define a stack of overlapping slabs of a same thicknesses in the 3D image data set;
      apply a one dimensional vHGW algorithm having a segment size defined by a slab thickness to strings of data that run through the stack, the one dimensional vHGW algorithm includes partitioning the data into overlapping segments or kernel of a fixed size, computing filtering operation using a scalar operator for each position of the slab in the stack, and merging accumulation values according to a binary operation for each position of the slab in the stack, thereby to generate corresponding strings of filtered data, each filtered datum representing a pixel in a two dimensional (2D) image data set composited from one of the slabs; and
      output a stack of the 2D image data sets from the stack of overlapping slabs.

2. The computer apparatus of claim 1, wherein the filtering operation uses a vector operator.

3. The computer apparatus of claim 2, wherein the filtering operation is volume rendering and the vector operator includes an opacity element and either a grayscale element or a set of color elements.

4. The computer apparatus of claim 1, wherein the data to which the one dimensional vHGW algorithm is applied is obtained by interpolation from the voxel data.

5. An image acquisition device comprising a computer apparatus according to claim 1.

6. The computer apparatus of claim 1, wherein the scalar operator is one of: maximum intensity projection, minimum intensity projection and average intensity projection.

7. A computer automated image processing method for volume data sets comprising:
providing a three dimensional (3D) image data set of voxel data occupying a volume;
defining a stack of slabs of a same thicknesses in the 3D image data set; and
applying a one dimensional vHGW algorithm having a segment size defined by a slab thickness to strings of data that run through the stack, the one dimensional vHGW algorithm includes partitioning the data into overlapping segments or kernel of a fixed size, computing filtering operation using a scalar operator for each position of the slab in the stack, and merging accumulation values according to a binary operation for each position of the slab in the stack, thereby to generate corresponding strings of filtered data, each filtered datum representing a pixel in a 2D image data set composited from one of the slabs; and
outputting a stack of two dimensional (2D) image data sets from the stack of overlapping slabs.

8. The method of claim 7, wherein the filtering operation uses a vector operator.

9. The method of claim 8, wherein the filtering operation is volume rendering and the vector operator includes an opacity element and either a grayscale element or a set of color elements.

10. The method of claim 7, wherein the data to which the one dimensional vHGW algorithm is applied is obtained by interpolation from the voxel data.

11. A non-transitory computer readable medium having a computer program recorded thereon, the computer program configured to perform the method of claim 7 when executed on a computer.

12. The method of claim 7, wherein the scalar operator is one of: maximum intensity projection, minimum intensity projection and average intensity projection.

* * * * *